United States Patent [19]

Rosenkranz et al.

[11] Patent Number: 4,590,028
[45] Date of Patent: May 20, 1986

[54] PROCESS FOR MAKING A MULTILAYERED PARISON OF THERMOPLASTIC MATERIAL

[75] Inventors: Otto Rosenkranz; Claus Horwege; Norbert Höne, all of Hamburg, Fed. Rep. of Germany

[73] Assignee: Krupp Corpoplast Maschinenbau GmbH, Fed. Rep. of Germany

[21] Appl. No.: 703,862

[22] Filed: Feb. 21, 1985

[30] Foreign Application Priority Data

Feb. 27, 1984 [DE] Fed. Rep. of Germany ....... 3407060

[51] Int. Cl.$^4$ .................... B29C 49/04; B29C 49/22
[52] U.S. Cl. .................................. 264/154; 156/268; 264/515; 264/138; 264/173; 264/296; 264/322; 425/523; 425/DIG. 58
[58] Field of Search ............... 264/154, 139, 138, 515, 264/516, 296, 322, 173; 425/DIG. 58, 523; 156/268, 254, 309.6

[56] References Cited

U.S. PATENT DOCUMENTS

| | | |
|---|---|---|
| 2,089,991 | 8/1937 | Boicey ........................... 264/138 X |
| 2,710,987 | 6/1955 | Sherman ......................... 425/523 X |
| 3,457,337 | 7/1969 | Turner ............................ 425/523 X |
| 3,929,943 | 12/1975 | Klimaszewski, Jr. ............... 264/25 |
| 3,970,498 | 7/1976 | Loew ............................. 156/268 X |
| 4,424,182 | 1/1984 | Cerny ............................ 264/138 |

FOREIGN PATENT DOCUMENTS 1704119 1/1974 Fed. Rep. of Germany .
3101284 8/1982 Fed. Rep. of Germany .

*Primary Examiner*—Philip Anderson
*Attorney, Agent, or Firm*—Harness, Dickey & Pierce

[57] ABSTRACT

A method is disclosed for making a three layered parison for blow molding a biaxially oriented hollow article of thermoplastic material. One end portion of an extruded tubular body is heated to welding temperature and closed to a bottom by a forming step. The central layer of the multilayered body is removed from part of the end portion before the forming step takes place to insure that the central barrier layer of the body allows for an intimate welding together of the inner and outer layer. A similar operation is used in making the finish portion of a container at the opposite end of the tubular body.

6 Claims, 4 Drawing Figures

PROCESS FOR MAKING A MULTILAYERED PARISON OF THERMOPLASTIC MATERIAL

FIELD OF THE INVENTION

In the production of biaxially oriented blow molded hollow articles one usually starts from using cold parisons. The parisons can be manufactured by a injection molding process or may be extruded. In the latter process the thermoplastic material is extruded in a continuous tube which is cut into individual portions.

BACKGROUND OF THE INVENTION

The tubular portions are sealed at one end to make a parison. For this the end portion of the tube is heated to welding and forming temperature. A hemi-spherical mandrel and a bottom mold are used to seal the heated end portion of the tube in a forming and welding operation (German Pat. No. 1 704 119).

In a similar operation the opposite end portion is formed to a finish portion in using a mandrel and an outer mold (German publication No. 3 101 284). U.S. Pat. No. 3,929,943 discloses to provide the end of a tubular portion with a circumferential bevel to enhance sealing and welding the end portion.

A single amorphous thermoplastic material, mainly polyethylene terephthalate (PET) may be used for the parisons. The hollow articles which are blowmolded under conditions of biaxial orientation exhibit excellent mechanical features and good barrier characteristics with respect to oxygen and carbonic acid.

However, there is a number of liquids which need an improved gas barrier feature of the hollow article. To obtain this improvement the hollow article is made of a multilayered parison, wherein the inner and outer layers are made of a thermoplastic material, for example PET and the intermediate layer or, respectively intermediate layers are made of a material having a high barrier characteristic.

Unfortunately, there is the danger, that the intermediate layer barrier prevents an intimate welding of the inner and outer layer when a multilayered tubular structure is heat formed in its end portions. In particular, the material of the medium layer flows towards the welding center in the sealing process, thus preventing proper welding of the inner to the outer layer. At best a weakened welding zone results.

SUMMARY OF THE INVENTION

It is an object of the present invention to provide a method for making a three or more layered parison for the blowmolding of the biaxially oriented article of thermoplastic material, in which the barrier material of the medium layer or, respectively the intermediate layers is not detrimental to the heat forming process of the end portions of the tubular bodies.

The present invention provides a method for making a parison comprising three or more layers for blowmolding a biaxially oriented hollow article of thermoplastic material, in particular a bottle, in which an extruded tubular portion which is open at both ends is heated to forming temperature in one end portion thereof which end portion is closed by a molding step. The improvements achieved by the present invention are obtained by removing the material of the medium layer or layers from the area adjacent the end face of the end portion to be sealed.

Accordingly this prevents that in sealing the end portion, material of the medium layer or layers flows to the welding center. Thus the inner and outer layer of thermoplastic material properly bond together in the central area of the bottom. The bottom center of the parison thus exhibits a substantially improved rigidity when it is stretched in the subsequent blow molding process. Nevertheless the barrier function of the medium layer is maintained up to a close proximity of the bottom center. Furthermore, the material of the medium layer cannot come into contact with the liquid filling of the bottle.

Using the conventional methods for making the finish portion of the container, there is the danger that the inner and outer layers are displaced with respect to each other by a relative motion of the inner mandrel and the outer mold, thus displacing the material of the medium layer inwardly. This should be avoided since the filling liquid may contact the medium layer which consists of a barrier material.

According to a further improvement of the present invention, the intermediate layer or layers adjacent the end portion becoming the finish portion of the article are removed adjacent the end face of the tubular portion before it is heat formed.

The relative movement between the inner and outer layer occurring in the heat forming process is benificial to bonding the inner and outer layer together, without running the danger that the medium layer is displaced to the surface. The medium layer is therefore completely enclosed by the inner and outer layer at the end portion thereof.

According to the invention removing the material may be obtained by displacing and/or cutting. Preferably the material is removed up to a depth of one to two layer thickness starting from the corresponding end face.

DETAILED DESCRIPTION

Figure 1:
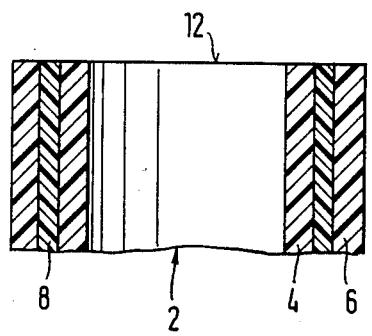
FIG. 1 is a sectional view of a multilayered tubular portion for making a parison according to the invention

Referring now in detail to the drawings, FIG. 1 shows the upper portion of a tubular body 2 which comprises three layers, i.e. an inner layer 4, an outer layer 6 and a medium layer 8. The inner layer 4 and the outer layer 6 are a thermoplastic material such as PET. The medium layer 8 is a barrier layer useful for certain sensitive liquids.

The tubular structure 2 is made by extruding the three layers referred to in a continuous cylindrical tube which is subsequently severed. One end of the tubular body 2 is to be sealed and the other end to be provided with a finish portion to obtain a parison 10 (FIGS. 3 and 4) which is then biaxially blow molded to a hollow article, for example a bottle.

Figure 2:
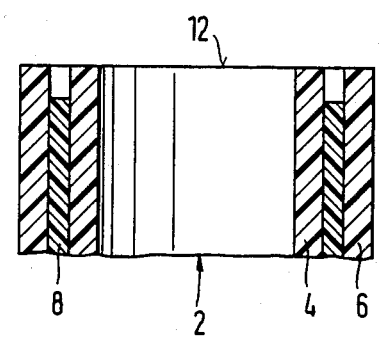
FIG. 2 is a section of the tubular portion of FIG. 1 with part of the medium layer removed

Before sealing the end portion of the tubular body 2, the medium layer 8 is removed from the end portion adjacent the end face 12. This is shown in FIG. 2.

To remove the material it may be displaced, for example. In this case a tool which is not shown which has a circular forward portion is axially advanced from the end face 12 between the inner layer 4 and the outer layer 6. The tool displaces the medium layer 8 to provide for a free space adjacent the end face 12.

Alternatively, the material of the medium layer 8 can be removed in the end portion by a cutting process by using a milling tool (not shown) or a similar cutting tool, for example.

Figure 3:
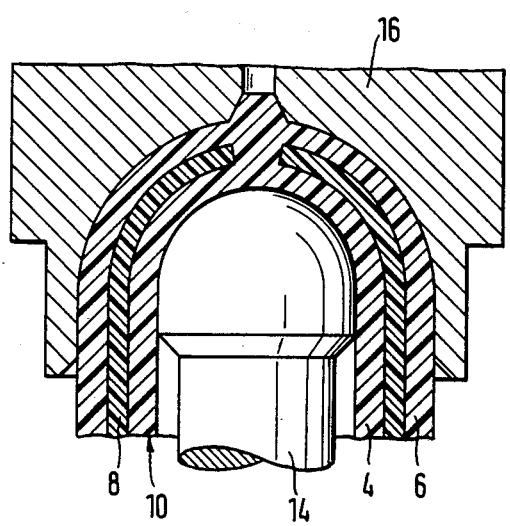
FIG. 3 is a section through a parison formed in a mold and FIG. 4 is a section of the finish portion of a parison.

After performing the removing step the end portion of the body 2 to be sealed is heated to welding and forming temperature and is then dome-shaped closed by a molding tool. As shown in FIG. 3 the forming tool comprises an inner mandrel 14 and an outer mold 16 which are axially moved with respect to each other to close the body 2 in a forging operation.

According to FIG. 3 the removal of a part of the medium layer 8 provides for an unhindered welding bond of the inner layer 4 and the outer layer 6 in the center portion of the bottom. The central layer 8 remains outside the welding zone, since the molten material of the inner layer 4 having an excessive volume mainly bonds to the outer layer 6.

Usually it is sufficient to remove the medium layer 8 up to a depth of approximately one or two layer thicknesses measured from the end face 12.

Figure 4:
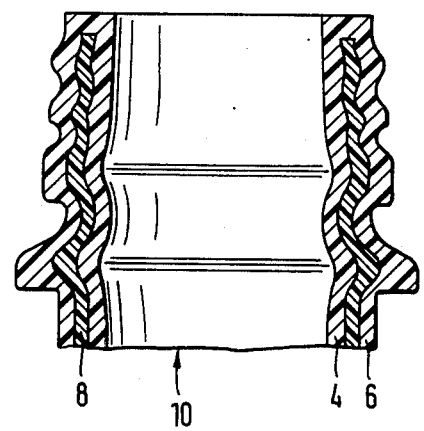

The opposite end portion of the body 2 is usually formed to a finish portion. Alike, the end portion is heated to welding temperature and the finish portion is heat formed by a conventional tool not shown comprising an inner mandrel and an outer mold. In order to prevent that this forming step results in displacing the center layer 8 adjacent the end face 12 radially inwardly so that the filling liquid may come into contact with the barrier layer, part of the barrier layer adjacent the end face is removed before forming the finish portion. Due to the relative displacement of the inner mandrel and the outer mold the inner layer 4 and outer layer 6 are intimately bonded together resulting in a finish portion, where the barrier layer 8 is completely enclosed by the inner and outer layer as shown in FIG. 4.

We claim:

1. A method for making a parison having three or more layers for blowmolding a biaxially oriented hollow article of thermoplastic material, in particular a bottle, in which an end portion of an extruded tubular body is heated to welding temperature and is closed to a bottom by a forming step, characterized by removing the medium layer or, respectively medium layers from the portion adjacent the end face of the end portion to be closed and subsequently heat forming the end portion.

2. The method of claim 1, wherein the material is removed by displacing and/or cutting.

3. The method of claim 1, wherein the material is removed up to a depth of one to two layer thicknesses measured from the end face.

4. The method of claim 1, in which the opposite end portion of the tubular body is heated to welding temperature and formed to a finish portion, characterized by removing the medium layer, or respectively, medium layers from the finish portion adjacent the end face of the tubular body and heat forming the finish portion.

5. The method of claim 4, wherein the material is removed by displacing and/or cutting.

6. The method of claim 4, wherein the material is removed up to a depth of one to two layer thicknesses measured from the end face.

* * * * *